3,298,755
PRESSURE-FLUID BEARINGS FOR
ROTATING SHAFTS
Gérald Gobert, Orsay, France, assignor to Commissariat
a l'Energie Atomique, Paris, France
Filed Nov. 5, 1963, Ser. No. 321,585
Claims priority, application France, Nov. 14, 1962,
915,365
11 Claims. (Cl. 308—122)

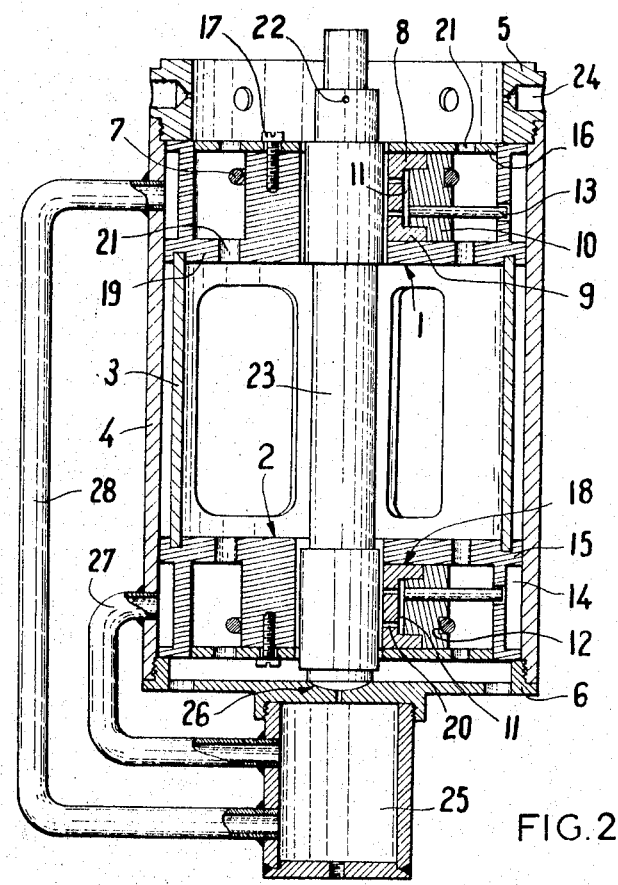
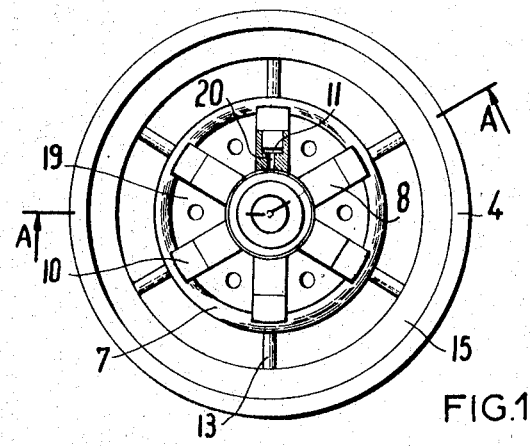

This invention relates to pressure-fluid bearings for rotating shafts. It is a general object of the invention to provide an improved fluid bearing, more especially a gas bearing, which will be effective to support a rotating shaft at extremely high angular velocities while being substantially incapable of transmitting any vibrations that tend to be set up by the rotating shaft.

In recent years pressure-fluid bearings have been developed for journalling shafts subjected to high rotational speeds at which the more traditional direct-contact bearings, including both ordinary smooth bearings and the so-called antifriction bearings (i.e. ball, roller and needle bearings) are inadequate due to the friction developed between the contacting metallic surfaces at such high speeds. The conventional fluid bearing generally comprises a more or less continuous annular surface surrounding the shaft in closely spaced relation with it and orifice means for injecting pressure fluid from a suitable source into the space between the shaft periphery and the surrounding annular surface so as to provide an annular film of fluid under high pressure supporting the shaft and preventing direct contact engagement between its surface and the surrounding annular surface.

With conventional fluid bearings of this general type, it has been found that vibrations tend to be generated by the rotation of the shaft especially at certain critical angular speeds and that such vibrations are transmitted and indeed sometimes amplified through the bearing structure. This serious drawback has in many cases imposed a limit on the angular velocities attainable with the use of pressure fluid bearings. An object of this invention is to overcome this limitation. A further object is to provide a simple, strong and economical bearing structure suitable for use at extremely high shaft velocities, and substantially insensitive to fluctuations in the pressure of the bearing fluid.

According to a basic concept of the invention, it has been found that the development and/or transmission of shaft vibrations through a fluid bearing can be greatly reduced or eliminated if the annular surface surrounding the shaft and confining the annular film of pressure fluid around the shaft periphery is subdivided into a plurality of bearing elements each of which is displaceable a limited radial extent towards and away from the shaft independently of the other elements. It is therefore a specific object of the invention to provide a practical fluid bearing construction operating on this principle.

In an important aspect, the invention comprises a bearing arrangement for a rotating shaft comprising a plurality of radially-displaceable, circumferentially-spaced elements surrounding the shaft and having their radially inner end surfaces closely spaced from the shaft surface, a pressure chamber defined in each element, at least one orifice formed through each element and providing communication from the pressure chamber to said radially inner end surface of the element, means supplying pressure fluid from a source thereof to all of said chambers, and means restraining the radial displacement of the elements.

Preferably the means supplying pressure fluid from the source to the pressure chambers within the individual elements comprises an annular reservoir chamber surrounding the annular array of elements in outwardly spaced relation therewith, and a tube projecting radially outward from each element and having its inner end connected with the pressure chamber therein, the outer end of the tube projecting slidably into the reservoir chamber through a related hole formed in the inner annular wall of said reservoir chamber.

The means restraining radial displacement of the elements may comprise an expansible ring member surrounding the array of elements. Alternatively the restraining means may comprise a plurality of separate springs associated with the respective elements.

An exemplary embodiment of the invention will now be described for purposes of illustration but not of limitation with reference to the accompanying drawings, wherein:

FIG. 1 is an overhead view of a vertical shaft supported for rotatioi by means of two pressure-gas bearing assemblies according to the invention, with the top wall of the upper assembly being removed and one of the bearing elements of the upper assembly being shown in section; and FIG. 2 is a view generally in axial section on the lines A—A of FIG. 1.

The shaft to be supported for rotation about its vertical axis is shown at 23. In the exemplary construction shown there are provided two pressure-gas bearing assemblies according to the invention respectively designated 1 and 2 and surrounding two vertically spaced journal surfaces of the shaft 23. The two bearing assemblies 1 and 2 are similar, and in order to clarify the showing in FIG. 2 the reference numerals designating the components of each bearing assembly have in some instances been shown with reference to the upper assembly 1 and in others with reference to the lower assembly 2.

The bearing assemblies 1 and 2 are separated by a tubular spacer 3 formed with wide lightening cutouts in its tubular wall and having its respective ends engaged in annular grooves formed as shown in the flat end surfaces of the bearing assemblies 1 and 2 facing each other. An outer casing 4 of generally cylindrical form surrounds both bearing assemblies. The inner surface of casing 4 surrounds spacer 3 in radially spaced relation with it and engages the outer peripheries of both bearing assemblies. The upper end of casing member 4 is internally screw threaded to receive therein the complementarily threaded lower end of an annular retainer member 5 which when screwed down into casing 4 firmly engages the upper surface of upper bearing assembly 1. The lower end of casing member 4 also is internally threaded and receives a bottom end flange 6 screwed therein.

Each of the bearing assemblies 1 and 2 comprises a main frame 15 in the form of a generally cylindrical cup-shaped casing having an annular outer wall with end flanges engaging the inner surface of cylindrical outer casing 4, so that said annular wall defines with said inner surface an annular chamber 14 providing a reservoir chamber for pressure gas as later explained. The cup-shaped frame 15 has a central hub or boss portion up standing from its base and formed with a central bore which surrounds the periphery of shaft 23 in closely spaced relation with it, and said central hub is formed with an equispaced series of radial slots, as seen in FIG. 1, herein six in number, extending in a star-shaped array from the central bore of said hub. The said slots, which have parallel walls, define between them generally wedge-shaped sections 19, as also seen in FIG. 2. In each of the radial slots just mentioned there in slidably fitted a bearing element or shoe member 8 having its radially inner end preferably formed with an arcuate surface adapted to coincide with an arcuate section of the bore in the hub. Each shoe member 8, or bearing element, is formed in two parts. A radially inner part 9 having a recess formed in its radially outer wall, as will be clearly seen in connection with the cut-away uppermost shoe member in FIG. 1, and a radially outer member 10 in the form of a plug fixedly engaged in said recess so as to define therein a pressure chamber 11 of small radial or depth dimension. A flat cover plate 16 is secured over the cup-shaped frame 15 by means of screws 17 engaging tapped holes formed in the adjacent surfaces of the wedge-shaped sections 19 of the hub, so as to enclose the shoe members 8 while permitting their free radial displacement within the slots in said hub.

Calibrated orifices 20, herein two per shoe member, provide communication from each pressure chamber 11 to the annular space surrounding shaft 23 inwardly of the shoe member. A rigid tube 13 is fitted radially through a hole formed in the plug 10 of each shoe member so that its inner end connects with the pressure chamber 11. The outer end of the tube 13 extends slidably through a related hole formed in the annular wall of the cup-shaped frame 15, so as to commnunicate with the annular reservoir chamber 14.

Means are provided for restraining the shoe members 8 against radial displacement, and said means in the example shown comprises an expansible ring 7 of elastic material, e.g. rubber, surrounding the entire array of shoe members 8, being seated in grooves formed in the outer surfaces of the plug members 10 thereof. According to a modification of the invention, not shown but easily comprehensible, the resilient restraining means may be provided in the form of separate springs associated with each bearing element or shoe 8 and acting between its radially outer surface and the inner surface of the peripheral wall of frame 15. Vent holes such as 21 are formed in the flat end walls of the bearing frame 15 to evacuate to atmosphere any pressure gas leaking into the annular space defined between the outer surfaces of the bearing elements 8 and the peripheral wall of frame 15.

Pressure gas is supplied to both reservoir chambers 14, in the illustrated embodiment, from a storage tank 25 secured to the under side of the base flange 6, e.g. screwed thereto as shown, and by way of pipes such as 27 and 28 respectively leading from tank 25 to the respective annular reservoir chambers 14. The base flange 6 is shown as provided with a central calibrated orifice through which pressure gas from tank 25 escapes into a socket 26 formed in the upper surface of flange 6 to provide a pressure-gas footstep bearing for the lower end of shaft 23. This particular footstep or thrust bearing arrangement is optional and forms no part of the invention.

FIG. 1 further illustrates a radial bore 22 in shaft 23 and sockets 24 in the top member 5 adapted to receive pick-up elements of a conventional tachometer arrangement, not further described, for measuring the angular velocity of the shaft.

In operation, with the tank 25 placed under pressure through suitable means not shown, the shaft 23 is driven in rotation from any appropriate source of power. Pressure gas flows through pipes 27, 28 to fill the reservoir chambers 14 at substantially the source pressure. Gas from each reservoir chamber 14 flows into all of the radial tubes 13 of the corresponding bearing assembly 1 or 2 into the pressure chambers 11 in the respective bearing elements 8. Any small amount of gas leaking into the intermediate annular space defined around the bearing elements is vented to atmosphere through vents 21. From the pressure chambers 11 pressure gas flows through the orifices 20 into the annular space surrounding the shaft 23 and forms there, under the action of centrifugal force created by shaft rotation, a continuous film of high-pressure gas preventing direct contact between the metal surfaces of the shaft, and of the inner part 9 of the shoe members 8, as is well-known in connection with pressure-gas bearing systems. Because of the relatively independent radial mobility of the individual bearing elements 8, each element is able at any instant to seek out its own equilibrium position as determined by the balance of fluid pressure forces acting in its pressure chamber 11 and in the annular space surrounding the shaft. A momentary over-pressure in the gaseous film on one side of the shaft, as may be produced by momentary excentricity of the shaft due to any cause, will not tend to generate vibration transmitted bodily to the bearing assembly as in the conventional continuous construction, but rather will merely tend to displace one or two of the bearing elements 8 to a small extent in a radially outward direction, thereby removing the over-pressure. The resulting relative displacements that tend to be set up between the individual bearing elements are effectively damped, both by the resilient restraining means such as expansible ring 7, and by the action of the rigid tubes 13 which behave somewhat in the manner of damper pistons.

It will be noted that the gas bearing assembly of the invention is relatively simple and economical to construct and requires but very little maintenance. It has been found to operate with a high degree of reliability and flexibility. Rotational speeds of 120,000 r.p.m. and more have been easily attained without substantially any vibrations being noted in the outer casing of the apparatus. Also, moderate-fluctuations in the pressure of the gas source used have been found not to affect the proper operation of the bearing.

It will be apparent that many modifications may be made in the construction of the single embodiment shown and described without departing from the scope of the invention. Thus one or more of the improved bearing assemblies may be used for rotatably supporting shafts or other revolving members arranged at any orientation in space, not necessarily vertical as shown. A footstep bearing such as 26 may be omitted, or may be provided at each end of the shaft. The number of bearing elements or shoes used may differ from the six shown and their construction may be modified in various ways.

What I claim is:

1. A bearing assembly for a rotating shaft comprising a circumferentially-spaced series of bearing elements adapted to surround a shaft and having radially-inner end surfaces adapted to be closely spaced from the shaft surface, means mounting said elements for limited, individual radial displacement towards and away from the shaft, a substantially closed pressure chamber defined within each element, at least one orifice formed in each element to provide passage for fluid under pressure in the pressure chamber to said radially inner end surface of the element for spacing said elements away from said shaft, means restraining the radial outward displacements of the elements, and means supplying fluid under pressure from a source thereof to all of said pressure chambers.

2. A bearing assembly for a rotating shaft comprising a circumferentially-spaced series of bearing elements adapted to surround a shaft and having radially-inner end surfaces closely spaced from the shaft surface, means mounting said elements for restricted individual radial displacement towards and away from the shaft, a pressure chamber defined in each element, at least one orifice formed in each element to provide communication from the pressure chamber to said radially inner end surface of the element, means defining an annular pressure-fluid reservoir chamber surrounding said series of elements in radially spaced relation with the outer ends thereof and including an inner annular peripheral wall for said reservoir chamber, apertures formed in said wall and associated with the respective elements, and a tube projecting radially outward from each element, and a tube projecting radially outward from each element and having its inner end communicating with the pressure chamber of the element and its outer end projecting slidably through an associated aperture in said annular wall to communicate with said pressure reservoir chamber.

3. The bearing assembly claimed in claim 2, including an expansible ring element surrounding all of the bearing elements to restrain resiliently the radial outward displacements thereof.

4. The bearing assembly claimed in claim 2, including spring means associated with the respective bearing elements for resiliently restraining the radial outward displacements thereof.

5. The bearing assembly claimed in claim 2, wherein each bearing element comprises a radially inner part and a radially outer part fixedly fitted into a recess of the radially inner part so as to define therewith said pressure chamber, said at least one orifice being formed through the radially inner part and extending from the bottom of said recess therein to the radially-inner end surface of said inner part, and said tube being fitted into a radial hole formed through said radially-outer part and projecting radially therefrom.

6. A bearing assembly for a rotating shaft comprising a generally cylindrical casing having an annular peripheral wall and generally flat end walls, a generally cylindrical hub portion positioned coaxially in said casing and having a central bore adapted to surround said shaft in closely spaced relation thereto, circumferentially-spaced series of radial slots formed in said hub portion and having generally parallel walls, a series of bearing elements mounted for radial sliding displacement in the respective slots and each having a pressure chamber defined therein, at least one orifice formed in each element to provide communication from the pressure chamber to the radially inner end surface of the element, means restraining the radial displacements of the elements, means defining an annular reservoir chamber for pressure gas around said casing said means including said annular wall, circumferentially spaced apertures in said annular wall associated with the respective elements, and rigid tubular means projecting radially outward from the respective elements and having inner ends communicating with said pressure chambers and outer ends projecting slidably through said respective apertures into communication with said reservoir chamber.

7. The bearing assembly claimed in claim 6, having vent means formed through at least one end wall of the casing in a region thereof intermediate the radially outer ends of said elements and said peripheral annular wall.

8. The bearing assembly claimed in claim 6, wherein said annular peripheral wall has an annular recess formed in its outer surface, and an outer cylindrical casing wall fitted around said casing to define said reservoir chamber.

9. A bearing arrangement for a rotating shaft comprising a pair of bearing assemblies adapted to be disposed in axially spaced relation along a shaft, each assembly comprising: a circumferentially-spaced series of bearing elements adapted to surround a shaft and having radially-inner end surfaces closely spaced from the shaft surface, means mounting said elements for restricted individual radial displacement towards and away from the shaft, a pressure chamber defined in each element, at least one orifice formed in each element to provide communication from the pressure chamber to said radially inner end surface of the element, means defining an annular pressure-fluid reservoir chamber surrounding said series of elements in radially spaced relation with the outer ends thereof and including an inner annular peripheral wall for said reservoir chamber, apertures formed in said wall and associated with the respective elements, and a tube projecting radially outward from each element and having its inner end communicating with the pressure chamber of the element and its outer end projecting slidably through an associated aperture in said annular wall to communicate with said pressure reservoir chamber.

10. A bearing arrangement as claimed in claim 9, further including a pressure-fluid thrust bearing associated with a least one of the end surfaces of the shaft.

11. The bearing assembly claimed in claim 1 wherein said pressure fluid is a gas.

References Cited by the Examiner
FOREIGN PATENTS
14,180    1894    Great Britain.

MARTIN P. SCHWADRON, *Primary Examiner.*

FRANK SUSKO, *Examiner.*